United States Patent [19]

Hirota

[11] Patent Number: 5,543,840
[45] Date of Patent: Aug. 6, 1996

[54] METHOD AND APPARATUS FOR FLANGE BACK ADJUSTMENT OF CAMERA INNER FOCUS LENS ASSEMBLY

[75] Inventor: Katsuaki Hirota, Kanagawa, Japan

[73] Assignee: Sony Corporation, Japan

[21] Appl. No.: 28,121

[22] Filed: Mar. 9, 1993

[30] Foreign Application Priority Data

Mar. 30, 1992 [JP] Japan ................................. 4-103645

[51] Int. Cl.⁶ .................................................. H04N 5/232
[52] U.S. Cl. .......................................... 348/345; 348/347
[58] Field of Search ............................. 358/209, 227; 354/400, 402, 404; 348/345, 347, 354, 356, 358, 335; H04N 5/30, 5/232

[56] References Cited

U.S. PATENT DOCUMENTS

| | | | |
|---|---|---|---|
| 4,740,064 | 4/1988 | Kono et al. | |
| 4,914,464 | 4/1990 | Azuma | 354/400 |
| 4,931,820 | 6/1990 | Matsuzawa | 354/402 |
| 4,963,985 | 10/1990 | Isoguchi et al. | 358/227 |
| 4,969,044 | 11/1990 | Hijikata et al. | 358/227 |
| 5,055,932 | 10/1991 | Hijikata | 358/227 |
| 5,060,001 | 10/1991 | Kaneda | 354/400 |
| 5,164,756 | 11/1992 | Hirasawa | 354/400 |
| 5,185,669 | 2/1993 | Kato | 358/227 |
| 5,202,992 | 4/1993 | Banno | 359/676 |
| 5,352,882 | 10/1994 | Koyanagi et al. | 250/201.7 |

FOREIGN PATENT DOCUMENTS

| | | |
|---|---|---|
| 0560646 | 9/1993 | European Pat. Off. |
| 3098006 | 4/1991 | Japan . |
| 4042108 | 2/1992 | Japan . |
| 4360378 | 12/1992 | Japan . |

Primary Examiner—Wendy Garber
Assistant Examiner—Tuan V. Ho
Attorney, Agent, or Firm—Ronald P. Kananen

[57] ABSTRACT

A lens position adjusting method for flange back adjustment of an inner focus lens assembly, which is suitable for a video camera is disclosed. The method comprises the steps of: moving a variator near to a telephoto end or a wide end; detecting a focal position by moving a focus lens when the variator is moved near to the telephoto end or the wide end; computing a difference in position between the variator and the telephoto end or the wide end, based on a moving distance of the focus lens to the focal position; and determining the position of the telephoto end or the wide end.

9 Claims, 5 Drawing Sheets

PRIOR ART under control of the focus lens when the zoom lens is moved near to the telephoto end or the wide end, and a difference between positions of the zoom lens and the telephoto end or the wide end is computed based on a moving distance of the focus lens to a focal position to determine positions of the telephoto end and the wide end.

METHOD AND APPARATUS FOR FLANGE BACK ADJUSTMENT OF CAMERA INNER FOCUS LENS ASSEMBLY

BACKGROUND OF THE INVENTION

1. Field of the Invention

This invention relates to a lens position adjusting method suited for flange back adjustment of an inner focus lens assembly and a video camera using such a lens position adjusting method.

2. Description of the Prior Art

In an inner focus lens assembly whose front lens is fixed, when zooming is changed by moving the variator, the focal position for a focus lens varies with movement of a zoom lens. To cope with the variation, in existing video cameras using such inner focus lens assembly, information on changes in focal position for the focus lens with movement of the variator is stored in advance in a memory as mapping data. A curve indicating changes in focal position of the focus lens with movement of the variator is called a tracking curve.

FIG. 1 is an example of a zoom tracking curve. In FIG. 1, the abscissa indicates the position of the variator, and the ordinate indicates the position of the focus lens. When the variator is moved, focalization can be maintained if the focus lens is moved in accordance with the tracking curve.

In the existing video cameras equipped with such an inner focus lens assembly, a table is prepared in accordance with the tracking curve. When the variator is moved, the position of the focus lens is controlled in accordance with the data in the form of the tracking curve stored in the memory. Thereby, even when the variator is moved, focalization is maintained.

Because of a lens mounting error or the like, there arises a difference between an actual tracking curve and the designed tracking curve stored in advance as mapping data. For correcting the difference, flange back adjustment is executed in the existing video cameras having an inner focus lens assembly.

The existing flange back adjustment is performed as follows. When the variator is first set to a position corresponding to a point of inflexion as designed, the position of the focus lens is controlled so that the focus lens moves to the focal position to detect the point of inflexion. When the focus lens reaches the focal position, the focus lens is moved by a designed moving distance of the focus lens from the point of inflexion to the telephoto end. When the focus lens reaches the telephoto end, the variator is moved to the focal position, and the position is provisionally stored as a telephoto end.

The variator is moved to the point of inflexion, and the focus lens is controlled to a focal position. The present focal position of the focus lens is compared with the previous focal position to determine whether a difference between the previous and present focal positions for the focus lens comes within the predetermined value. The process is repeated, until the difference between the previous and present focal positions for the focus lens comes within the predetermined value. When the difference between the previous and present focal positions for the focus lens comes within the predetermined value, the position is determined as the telephoto end.

Then, the focus lens is moved from the wide end to the telephoto end by a designed moving distance for the focus lens. The variator is moved to a focal position, and the focal position is determined as a wide end.

As mentioned above, in the existing flange back adjustment, the variator is moved to a focal position, and the focal position is determined as a telephoto end. To detect a position for the telephoto end by moving the variator to a focal position, it is necessary to sample data in such a manner as to maintain the accuracy completely within the depth of focus. As a result, it becomes impossible to make flange back adjustment by moving the variator at a high speed.

FIG. 2 is a tracking curve near the telephoto end. To detect focalization, it is necessary to move a lens within the depth of focus. Therefore, in FIG. 2, to obtain accuracy within fd, where fd is the depth of focus, it is necessary to obtain sampled values within accuracy of distance $t_d$, when the variator is moved. FIG. 2 shows a case where the variator is moved at a high speed. When sampling timing is constant in this case, distance between samplings t becomes longer as the variator is moved faster, which makes it impossible to keep the distance between samplings t within the distance $t_d$. As a result, in the existing method, some limitations reside in the moving speed of the variator in the case of the flange back adjustment.

OBJECTS AND SUMMARY OF THE INVENTION

It is therefore an object of the invention to provide a lens position adjusting method that permits to make flange back adjustment by moving the variator at a high speed, and to shorten adjusting time.

Another object of the invention is to provide a video camera that permits to make flange back adjustment at a high speed, and to shorten adjusting time.

According to an aspect of the invention, there is provided a lens position adjusting method for flange back adjustment, comprising the steps of: moving a variator near to a telephoto end or a wide end; detecting a focal position by moving a focus lens when a variator is moved near to the telephoto end or the wide end; computing a difference in position between the variator and the telephoto end or the wide end, based on a moving distance of the focus lens to the focal position; and determining the position of the telephoto end or the wide end.

In flange back adjustment, a difference between position of a variator and position of a telephoto end or a wide end is computed by obtaining a focal position after the variator is moved near to the telephoto end or the wide end. Thereby, the variator can be moved at a high speed.

According to another aspect of the invention, there is provided a video camera comprising:

a group of lenses including a focus lens for collecting light from a subject to be photographed and a zoom lens;

an image pickup device for converting the light collected by the group of lenses into an electric signal;

an analog-to-digital converting circuit for converting an output signal from the image pickup device into a digital signal;

a detecting circuit for detecting a focalization by an output signal from the analog-to-digital converting circuit; and a control circuit for controlling the group of lenses based on an output signal from the detecting circuit, wherein the zoom lens is moved near to a telephoto end or a wide end, a focalization curve is obtained by focalizing the focus lens and a reference position at the telephoto end or the wide end of the zoom lens is computed from the focalization curve.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
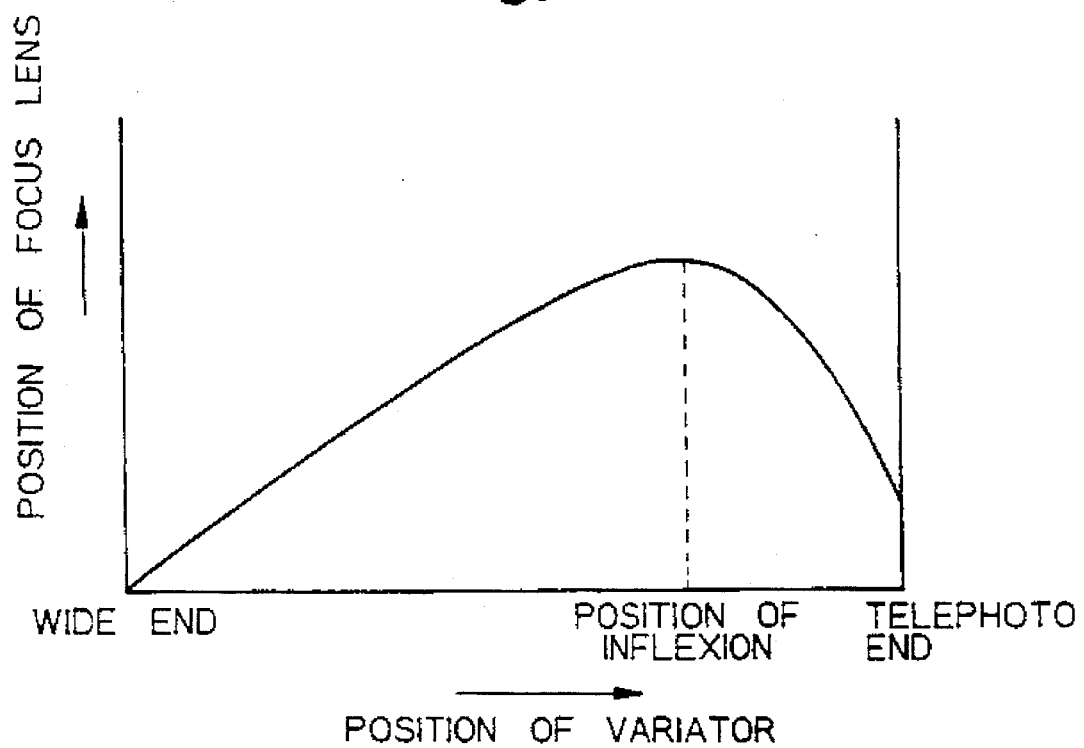
FIG. 1 is a graph used for the existing flange back adjustment.
Figure 2:
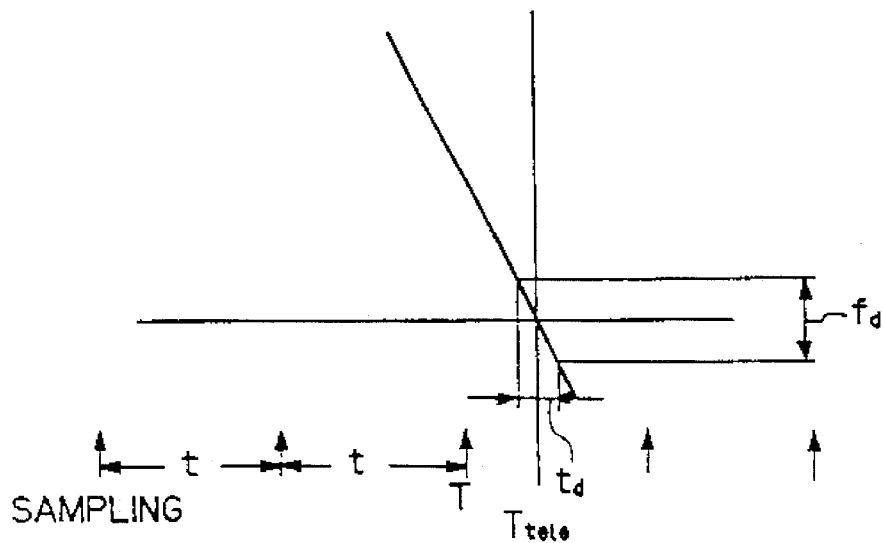
FIG. 2 is a schematic diagram used for explanation of the existing flange back adjustment.
Figure 3:
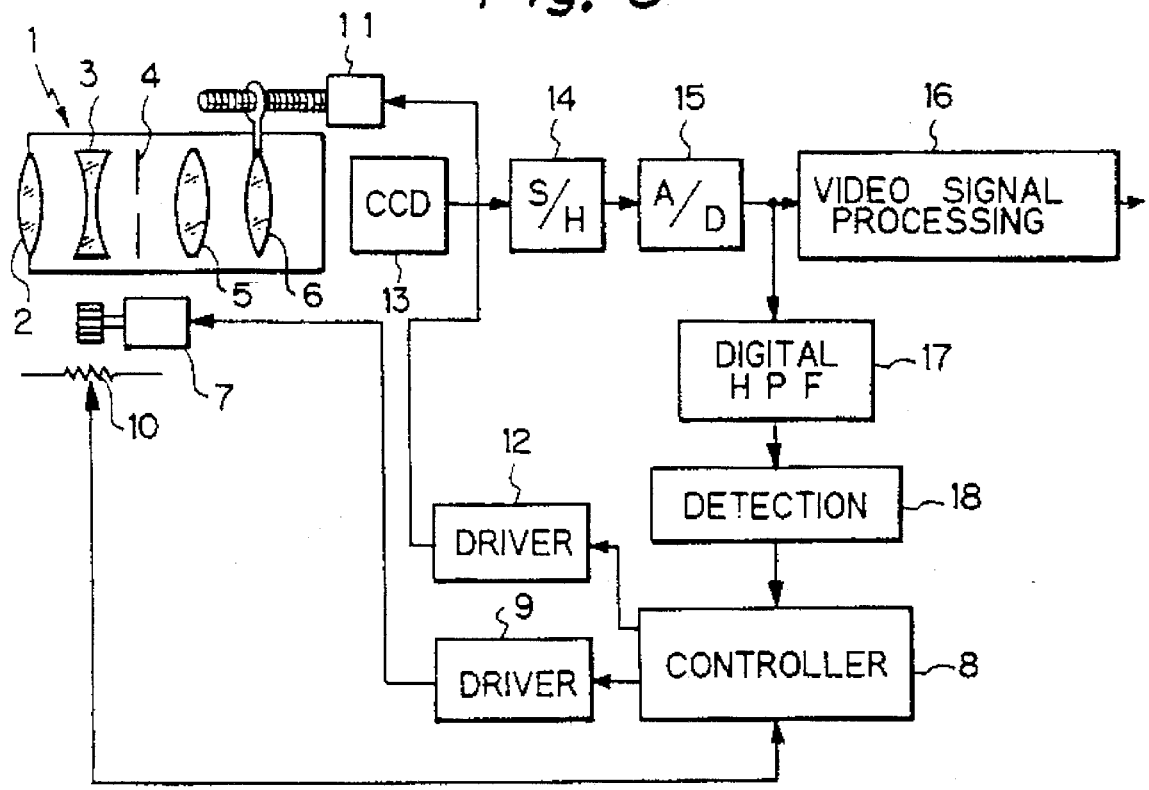
FIG. 3 is a block diagram of an example of a video camera to which the invention can be applied.

An embodiment of the invention is explained below with reference to the drawings. FIG. 3 shows a construction of a video camera to which the invention may be applied. In FIG. 3, reference numeral 1 denotes an inner focus lens assembly. The inner focus lens 1 comprises a fixed lens 2, a variator 3, an iris 4, a fixed lens 5, and a focus lens 6.

The variator 3 is controlled for position by a DC motor 7. To the DC motor 7 is supplied a driving signal from a controller 8 through a driver 9. The lens position of the variator 3 is detected by a potentiometer 10. The detection output of the potentiometer 10 is supplied to the controller 8.

The focus lens 6 is controlled for position by a step motor 11. To the step motor 11 is supplied a driving signal through a driver 12. By moving the focus lens 6, focalization of an image of a subject can be obtained.

Rays of light of a subject sent through the inner focus lens assembly 1 is focused onto an image pickup surface of a CCD image pickup device 13. An output from the CCD image pickup device 13 is supplied to an A/D converter 15 through a sample and holding circuit 14. An output from an A/D converter 15 is supplied to a video signal processing circuit 16. The image signal is processed by a video signal processing circuit 16.

An output from the A/D converter 15 is supplied to a digital high pass filter 17. A high frequency component of an image signal extracted by the digital high pass filter 17 is supplied to a detecting circuit 18. The level of a high frequency component in the image signal is detected by the detecting circuit 18. An output from the detecting circuit 18 is supplied to the controller 8.

At a focal position, the high frequency component in the image signal reaches at its maximum. An output from the detecting circuit 18 is integrated by the controller 8 for a predetermined area. Then, an estimated value is obtained. The lens position is controlled so that the estimated value will be at its maximum. Thereby, an automatic focusing control is performed.

When the variator 3 is moved, the position of the focus lens 6 at a focal position changes. Therefore, for the controller 8 is prepared in advance a table corresponding to the tracking curve. When the variator 3 is moved, the focus lens 6 is moved in accordance with the tracking curve. Thereby, the focalization is maintained even when the variator 3 is moved.

Because of accuracy in lens mounting, there arises an error between an actual tracking curve and a tracking curve obtained in advance. In an embodiment of the invention, flange back adjustment is made in the following manner.

Figure 4:
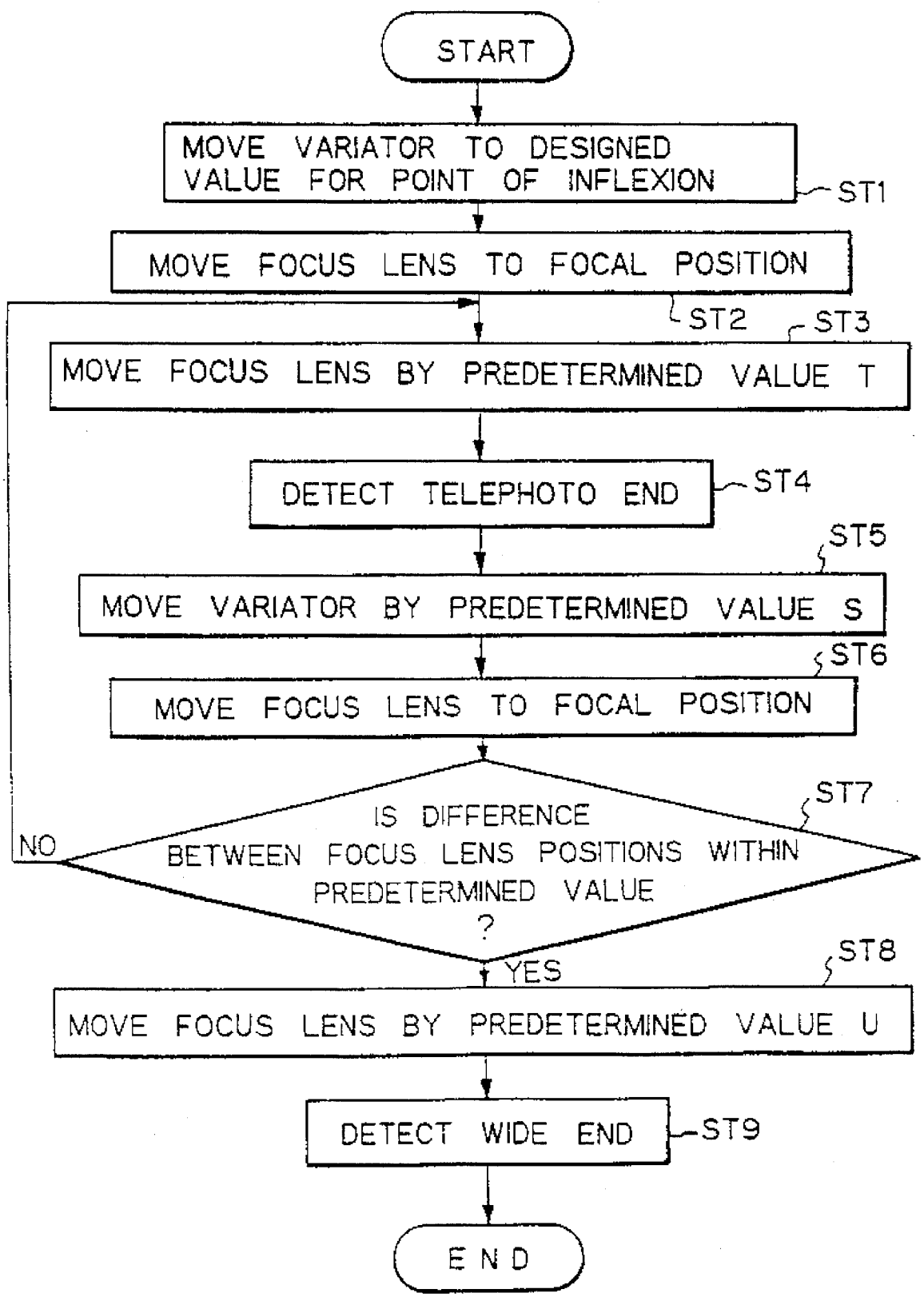
FIG. 4 is a flow chart used for explanation of flange back adjustment.
Figure 5:
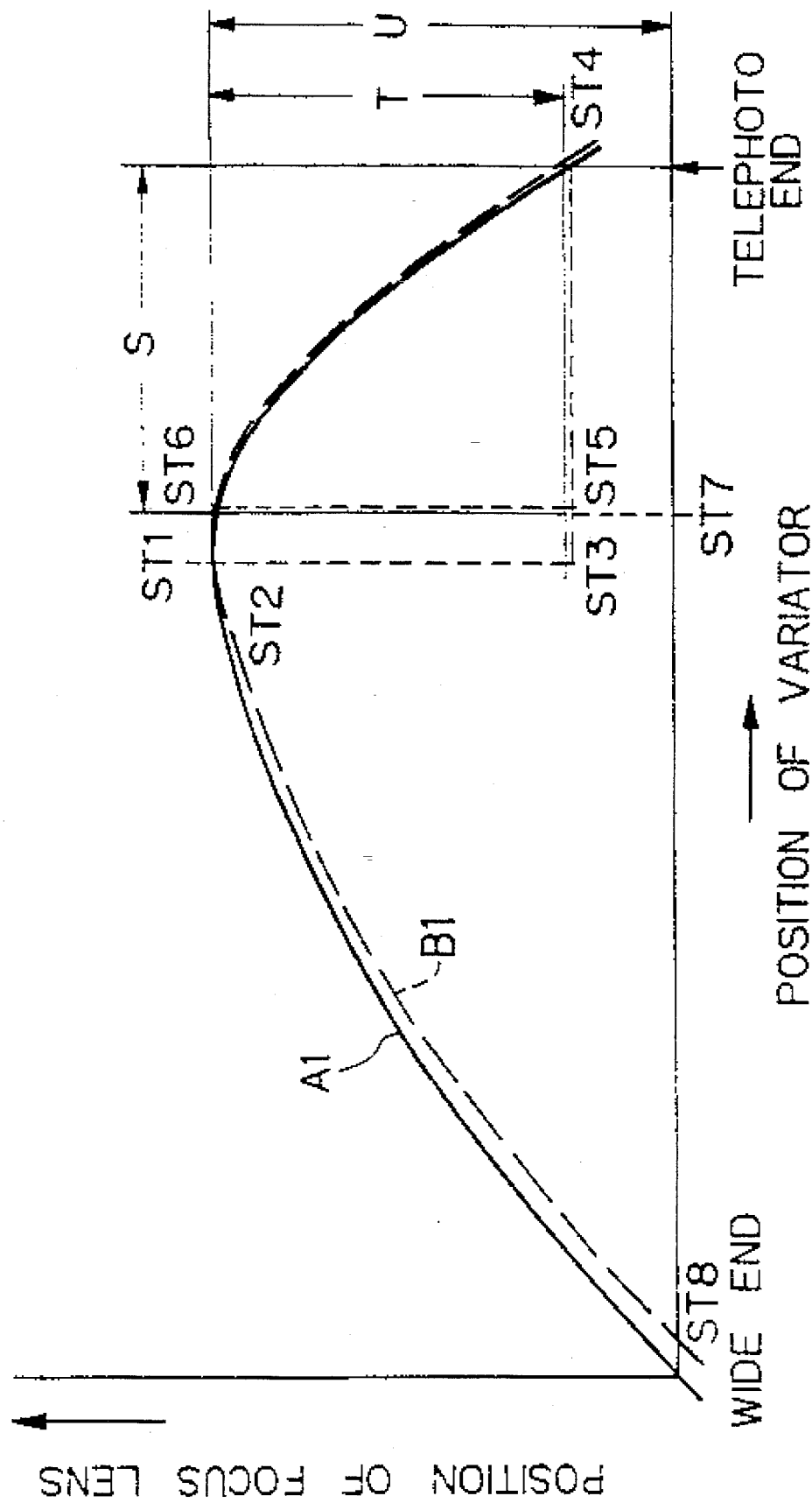
FIG. 5 is a graph used for explanation of flange back adjustment.

FIG. 4 indicates a flow chart of the flange back adjustment, and FIG. 5 indicates the lens position for the respective steps. In FIG. 5, the respective reference numerals correspond to movements of the lenses in the respective steps. Still in FIG. 5, the abscissa indicates the position of the zoom lens, and the ordinate indicates the position of the focus lens 6. It is assumed that A1 is a tracking curve stored as mapping data, and B1 is an actual tracking curve.

As shown in FIGS. 4 and 5, the variator 3 is first set at a position corresponding to a point of inflexion as designed (step ST1). The point of inflexion corresponds to a peak value of the tracking curve.

When the variator 3 is moved to the designed point of inflexion, the focus lens 6 is controlled to move to a focal position. When the focus lens 6 reaches the focal position, the present focal position is stored (ST2).

When the focus lens 6 reaches the focal position, the focus lens 6 is moved by a predetermined amount T. The amount T is a designed moving distance of the focus lens 6 from the point of inflexion to the telephoto end (step ST3).

Figure 6:
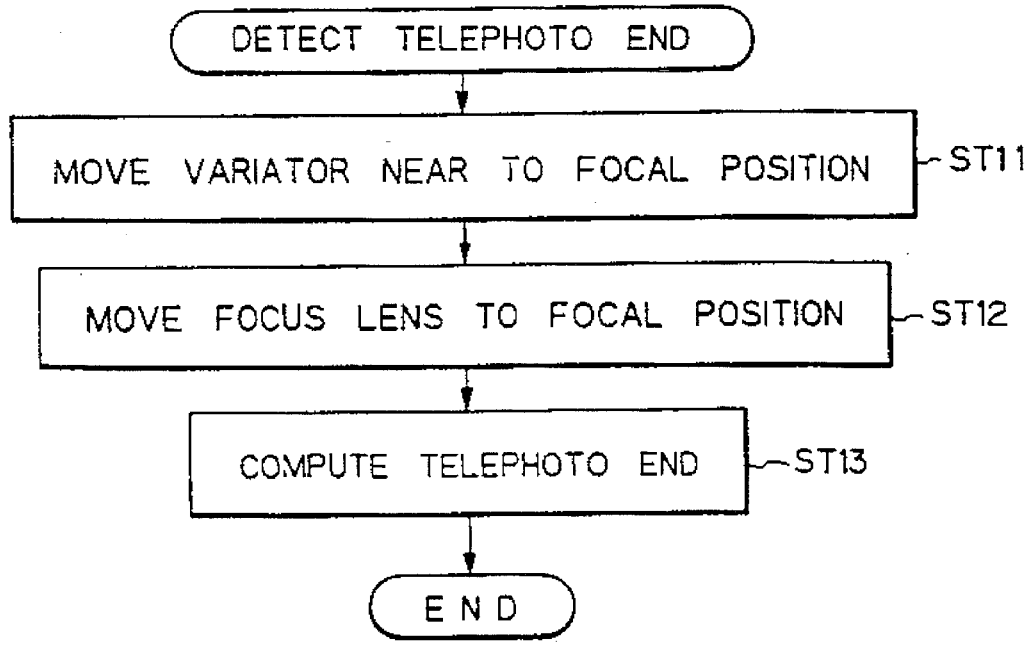
FIG. 6 is a flow chart used for explanation of an embodiment of the invention.

When the focus lens 6 is moved, the position at the telephoto end for the variator is detected, and the position is stored provisionally (step ST4). As shown in FIG. 6, the detection of the telephoto end is executed by moving the variator 3 near to the focal position (step ST11), moving the focus lens 6 to the focal position (step ST12), computing a distance of the variator 3 from the telephoto end based on the moving distance of the focus lens 6, and determining the position at the telephoto end (step ST13). Thereby, it becomes possible to move the variator 3 at a high speed by detecting the position at telephoto end. The detection of the telephoto end is detailed later.

In FIG. 4, when the telephoto end is stored provisionally, the variator 3 is moved by a predetermined amount S. The predetermined amount S is a designed moving distance of the variator 3 from the point of inflexion to the telephoto end (step ST5).

When the variator 3 is moved, the focus lens 6 is controlled to move to a focal position, and the present focal position is stored (step ST6).

The previous focal position for the focus lens 6 stored in step ST2 is compared with the present focal position for the focus lens 6 to determine whether a difference between the positions for the focus lens 6 is within a predetermined value (step ST7).

If the difference between the previous and present focal positions for the focus lens 6 does not reach the predetermined value, control returns to step ST3, and the same process is repeated until the difference between previous and present focal positions for the focus lens 6 comes within the predetermined value.

When the difference between the previous and present focal positions for the focus lens 6 comes within the predetermined value, the focus lens 6 is moved from the wide end to the telephoto end by a designed moving distance (u) for the focus lens 6 (step ST8).

Then, the position at the wide end for the variator 3 is detected (step ST9). As in the case of the telephoto end, the position at the wide end can be determined by moving the variator 3 near to the focal position, moving the focus lens 6 to the focal position, and computing a difference in position of the variator 3 from the position of the focus lens 6.

By the steps mentioned above, the flange back adjustment is completed.

As already mentioned above, according to an embodiment of the invention, the process shown in FIG. 6 permits to move the variator 3 at a high speed and to detect the position of the telephoto end. This process will be detailed below.

Figure 7:
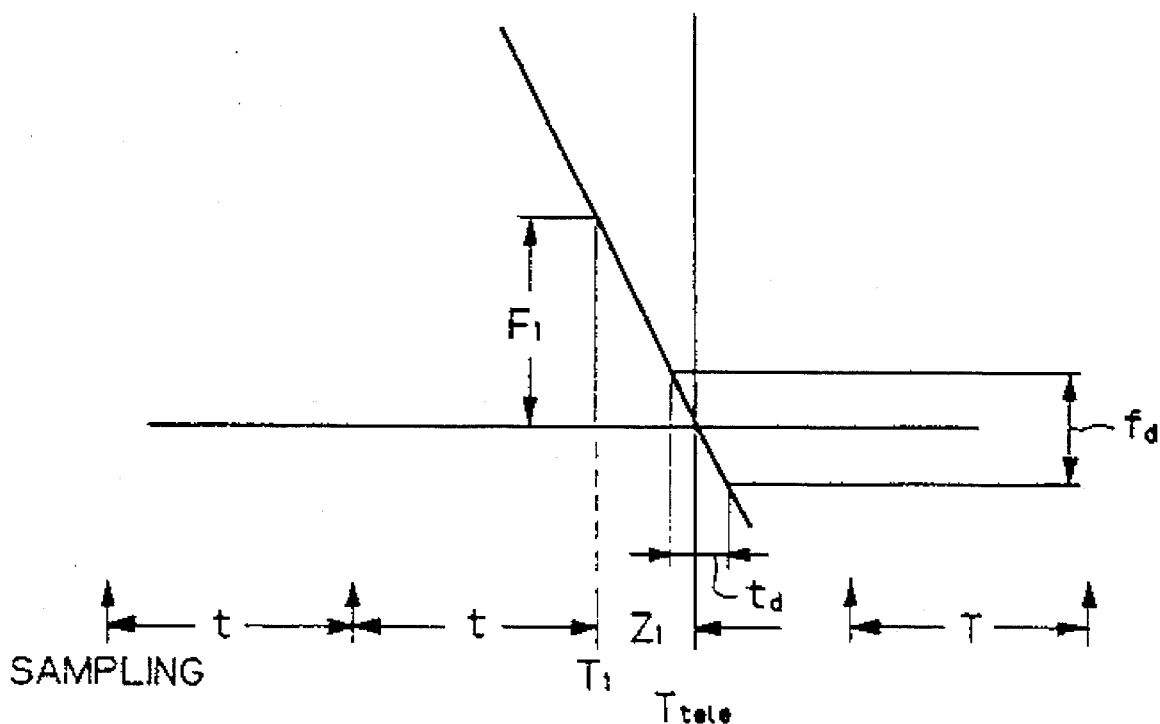
FIG. 7 is a schematic diagram used for explanation of the embodiment of the invention.

FIG. 7 indicates the tracking curve near the telephoto end. As shown in step ST4, which has been mentioned above, to detect a focal position by moving the variator 3, it is necessary to move the variator 3 in such a manner that sampling can be made within accuracy of distance $t_d$, where $t_d$ is the moving distance of the lens at the depth of focus $f_d$.

In the video camera to which the invention is applied, the moving speed of the variator 3 becomes higher, and the distance between samplings t is larger than the distance $t_d$. In an embodiment of the invention, after the variator 3 is moved near to a focal position, focalization is made by the focus lens 6, and then a difference in position is computed.

More specifically, the position at the telephoto end $T_{tele}$ is detected by focalizing the variator 3 at the telephoto end $T_{tele}$. It is assumed that the variator 3 is moved near to the focal position T1 and the focus lens is moved by F1, where focalization is made. It is also assumed that a difference between position of the variator 3, T1 and telephoto end $T_{tele}$ is $Z_1$.

At this time, the position at the telephoto end $T_{tele}$ is:

$$T_{tele} = T_1 + Z_1$$

When the gradient of the tracking curve near at the telephoto end is "a", $$Z_1 = (1/a) \times F_1$$

Therefore, the position at the telephoto end $T_{tele}$ is:

$$T_{tele} = T_1 + (1/a) \times F_1$$

as the computing result.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, although the description mentioned above is only for the detection of the position at the telephoto end, the position at the wide end can be determined in the same manner.

According to the invention, in the flange back adjustment, a difference in position between the variator and the telephoto end or the wide end is computed after moving the variator near to the telephoto end or the wide end, and obtaining a focal position by the focus lens. Thereby, the variator can be moved at a high speed.

What is claimed is:

1. A lens position adjusting method for flange back adjustment of an inner focus lens assembly, comprising the steps of:

moving a variator through a first predetermined distance to a position near a selected one of a telephoto end and a wide end;

detecting a focal position by moving a focus lens after said variator is moved near to the selected one of said telephoto end and said wide end until focus is achieved and the focus lens reaches a focal position;

computing a distance said focus lens moves before reaching the focal position; and determining the position of the selected one of said telephoto end and said wide end and storing the determined position as the selected one of said telephoto end and wide end in the event that the distance the focus lens moves through to reach the focal position is less than a predetermined value.

2. A video camera comprising:

a group of lenses including a focus lens for collecting light from a subject to be photographed and a zoom lens;

an image pickup device for converting the light collected by said group of lenses into an electric signal;

an analog-to-digital converting circuit for converting an output signal from said image pickup device into a digital signal;

a detecting circuit for detecting a focalization by an output signal from said analog-to-digital converting circuit; and a control circuit for controlling said group of lenses based on an output signal from said detecting circuit, said control circuit including means for:

moving said zoom lens near to a selected one of a telephoto end and a wide end, obtaining focalization curve data by:

focalizing said focus lens, determining a reference position at the selected one of said telephoto end and the wide end using the amount of distance required to move said focus lens into said focal position, and storing the determined reference position as a new value for the selected one of said telephoto end and said wide end in the focalization curve data.

3. A video camera according to claim 2, wherein said focalization curve has a point of inflexion and wherein a first movement of said zoom lens to the point of inflexion is performed, a first movement of said focus lens to a focal position is performed, the telephoto end or the wide end is detected by moving said focus lens by a predetermined distance and a second movement of said zoom lens to the focal position is performed.

4. A video camera according to claim 3, wherein after the second movement of said zoom lens is performed, the second movement of said focus lens to the focal position is performed.

5. A video camera according to claim 4, wherein after the second movement of said focus lens is performed, said control circuit determines whether a difference in position of said focus lens from the focal position is smaller than a predetermined value.

6. A video camera according to claim 5, wherein when the difference in position of said focus lens from the focal position is larger than the predetermined value, the first movement of said focus lens is performed again.

7. A video camera according to claim 6, wherein when the difference in position of said focus lens from the focal position is smaller than the predetermined value, said focus lens is moved by a predetermined distance and thereafter the telephoto end or the wide end is detected.

8. A video camera comprising:

a group of lenses including a focus lens for collecting light from a subject to be photographed and a variator;

an image pickup device for converting the light collected by said group of lenses into an electric signal;

a detecting circuit for detecting a focalization by an output signal from an analog-to-digital converting circuit which converts an output signal from said image pickup device into a digital signal; and a control circuit for controlling said group of lenses based on an output signal from said detecting circuit, said control circuit including means for:

(a) moving said variator to a point of inflection in accordance with prememorized design specification data;

(b) moving said focus lens until said detection circuit indicates said focus lens has assumed a focal position;

(c) storing the position of the focus lens as a first focal position;

(d) moving said focus lens from the focal position by a first predetermined distance (T) which, in accordance with the prememorized design specification data, will locate said focus lens at a telephoto end;

(e) moving said variator to a position proximate the focal position;

(f) moving said focus lens until said focus lens assumes a focal position wherein the image signal exhibits the predetermined maximum value;

(g) deriving a distance moved by said focus lens;

(h) determining an actual telephoto end based on the distance derived in step (g) and provisionally storing said distance;

(i) moving said variator by a predetermined distance (S) which, in accordance with the pre-memorized design specification data, will move said variator from the point of inflection to the telephoto end;

(j) moving said focus lens until said detection circuit indicates said focus lens has assumed a focal position;

(k) storing this focal position as a second focal position;

(l) comparing difference between first and second focal positions with a predetermined value;

(m) repeating steps (d) to (l) if the difference is not less than said predetermined value;

(n) moving said focus lens by a predetermined distance (U) toward a wide end which .in accordance with the pre-memorized design specification will locate said focus lens at a wide end if the difference is less than said predetermined value;

(o) moving said variator to a position proximate the focal position;

(p) moving said focus lens to until said detection circuit indicates the said variator has assumed a focal position; and (p) using the position of said focus lens to derive a difference in variator position.

9. A method of operating a video camera which includes: a group of lenses including a focus lens for collecting light from a subject to be photographed and a variator; an image pickup device for converting the light collected by said group of lenses into an electric signal; a detecting circuit for detecting a focalization by an output signal from an analog-to-digital converting circuit which converts an output signal from said image pickup device into a digital signal; and a control circuit for controlling said group of lenses based on an output signal from said detecting circuit, comprising the steps of:

(a) moving said variator to a point of inflection in accordance with prememorized design specification data;

(b) moving said focus lens until said detection circuit indicates said focus lens has assumed a focal position;

(c) storing the position of the focus lens as a first focal position;

(d) moving said focus lens from the focal position by a first predetermined distance (T) which in accordance with the prememorized design specification data will locate said focus lens at a telephoto end;

(e) moving said variator to a position proximate the focal position;

(f) moving said focus lens until said focus lens assumes a focal position wherein the image signal exhibits the predetermined maximum value;

(g) deriving a distance moved by said focus lens;

(h) determining an actual telephoto end based on the distance derived in step (g) and provisionally storing said distance;

(i) moving said variator by a predetermined distance (S) which, in accordance with the pre-memorized design specification data, will move said variator from the point of inflection to the telephoto end;

(j) moving said focus lens until said detection circuit indicates said focus lens has assumed a focal position;

(k) storing this focal position as a second focal position;

(l) comparing difference between first and second focal positions with a predetermined value;

(m) repeating steps (d) to (l) if the difference is not less than said predetermined value;

(n) moving said focus lens by a predetermined distance (U) toward a wide end which in accordance with the pre-memorized design specification will locate said focus lens at a wide end if the difference is less than said predetermined value;

(o) moving said variator to a position proximate the focal position;

(p) moving said focus lens to until said detection circuit indicates said variator has assumed a focal position; and (q) using the position of said focus lens to derive a difference in variator position.

* * * * *